US010979423B1

(12) United States Patent
Garner, IV et al.

(10) Patent No.: US 10,979,423 B1
(45) Date of Patent: Apr. 13, 2021

(54) BI-DIRECTIONAL VOICE AUTHENTICATION

(71) Applicant: Wells Fargo Bank, N.A., San Francisco, CA (US)

(72) Inventors: Andrew J. Garner, IV, State Road, NC (US); Tyua Larsen Fraser, Livermore, CA (US); Kimberly Ann MacInnis, San Francisco, CA (US); Paul R. McMahon, Dayton, MN (US); Darrell Lee Suen, San Ramon, CA (US); Zhong Wan, Pacifica, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 320 days.

(21) Appl. No.: 15/799,250

(22) Filed: Oct. 31, 2017

(51) Int. Cl.
  *H04L 29/06* (2006.01)
  *G10L 15/18* (2013.01)
  (Continued)

(52) U.S. Cl.
  CPC ...... *H04L 63/0861* (2013.01); *G10L 15/1815* (2013.01); *G10L 15/1822* (2013.01);
  (Continued)

(58) Field of Classification Search
  CPC ............. H04L 63/0861; H04L 63/0853; G10L 15/1815; G10L 15/1822; G10L 17/06; G10L 17/22
  See application file for complete search history.

(56) References Cited

U.S. PATENT DOCUMENTS 5,280,527 A * 1/1994 Gullman ............ G06K 19/0718
                                               713/184
7,168,091 B2   1/2007 Schutzer
(Continued)

FOREIGN PATENT DOCUMENTS

CN          106042828         10/2016

OTHER PUBLICATIONS

Qi Li and Biing-HwangJuang "Speaker Verification Using Verbal Information Verification for Automatic Enrollment", 1998, IEEE, pp. 133-136 (Year: 1998).*

(Continued)

*Primary Examiner* — Catherine Thiaw
(74) *Attorney, Agent, or Firm* — Schwegman Lundberg & Woessner, P.A.

(57) ABSTRACT

Systems and techniques for bi-directional voice authentication are described herein. A first audio segment and a first description of the first audio segment may be received. An authentication token may be created using the first audio segment and the first description. An authentication request may be received from the user. The first audio segment may be transmitted to the user. A second description of the first audio segment may be received from a device of the user in response to the transmission of the first audio segment. The second description may be compared to the first description. The authentication token may be selected based on the comparison. The authentication token may be transmitted to the device. Requests of the user for secure information may be authenticated using the authentication token for a duration of an interaction session between the user and the device.

25 Claims, 6 Drawing Sheets

(51) Int. Cl.
*G10L 17/22* (2013.01)
*G10L 17/06* (2013.01)

(52) U.S. Cl.
CPC .............. *G10L 17/06* (2013.01); *G10L 17/22* (2013.01); *H04L 63/0853* (2013.01)

(56) References Cited

U.S. PATENT DOCUMENTS

| | | | | |
|---|---|---|---|---|
| 8,082,448 | B2* | 12/2011 | Vandervort | G06F 21/32 |
| | | | | 713/186 |
| 8,151,326 | B2 | 4/2012 | Brown | |
| 8,413,220 | B1* | 4/2013 | Quinn | G06F 21/36 |
| | | | | 709/225 |
| 8,599,836 | B2 | 12/2013 | Van Buren et al. | |
| 9,021,565 | B2 | 4/2015 | Novack et al. | |
| 9,225,701 | B2 | 12/2015 | Gongaware et al. | |
| 9,310,977 | B2 | 4/2016 | Ahmed et al. | |
| 9,342,677 | B2 | 5/2016 | Ali et al. | |
| 9,407,766 | B1* | 8/2016 | Bradley | H04M 3/42357 |
| 9,473,490 | B2 | 10/2016 | Clausen et al. | |
| 9,639,676 | B2 | 5/2017 | Betz et al. | |
| 10,559,312 | B2* | 2/2020 | Aronowitz | G10L 17/10 |
| 10,587,594 | B1* | 3/2020 | McClintock | G06F 21/36 |
| 2005/0071168 | A1* | 3/2005 | Juang | G10L 17/14 |
| | | | | 704/273 |
| 2006/0235796 | A1* | 10/2006 | Johnson | G06Q 20/02 |
| | | | | 705/44 |
| 2008/0126097 | A1* | 5/2008 | Sarid | H04L 61/3015 |
| | | | | 704/270.1 |
| 2008/0312926 | A1* | 12/2008 | Vair | G10L 17/14 |
| | | | | 704/249 |
| 2010/0124902 | A1* | 5/2010 | Hoh | H04L 63/0869 |
| | | | | 455/411 |
| 2011/0143715 | A1* | 6/2011 | Labrador | H04M 3/382 |
| | | | | 455/411 |
| 2013/0006626 | A1* | 1/2013 | Aiyer | G06F 21/32 |
| | | | | 704/235 |
| 2013/0097682 | A1* | 4/2013 | Zeljkovic | H04L 9/3231 |
| | | | | 726/7 |
| 2013/0132091 | A1* | 5/2013 | Skerpac | G07C 9/37 |
| | | | | 704/273 |
| 2014/0359739 | A1* | 12/2014 | Bao | G06F 21/32 |
| | | | | 726/7 |
| 2015/0254443 | A1* | 9/2015 | Blessing | G06F 21/32 |
| | | | | 726/7 |
| 2016/0262017 | A1* | 9/2016 | Lavee | G06F 21/31 |
| 2018/0007060 | A1* | 1/2018 | Leblang | H04L 63/105 |
| 2018/0115547 | A1* | 4/2018 | Peterson | H04L 63/08 |
| 2018/0308472 | A1* | 10/2018 | Lopez Moreno | G06F 16/636 |
| 2019/0334884 | A1* | 10/2019 | Ross | G06F 21/31 |

OTHER PUBLICATIONS

Marcia Gibson, Karen Renaud, Marc Conrad "Musipass: Authenticating Me Softly with "My" Song", ACM, NSPW'09, Sep. 8-11, 2009, Oxford, United Kingdom, pp. 85-100 (Year: 2010).*
Goodrich, Michael T., "Loud and Clear: Human-Verifiable Authentication Based on Audio", Proceedings of the 26th IEEE International Conference on Distributed Computing Systems, (2006), 8 pgs.

* cited by examiner

BI-DIRECTIONAL VOICE AUTHENTICATION

TECHNICAL FIELD

Embodiments described herein generally relate to voice-enabled authentication and, in some embodiments, more specifically to bi-directional voice authentication.

BACKGROUND

Users of voice-enabled systems may be authenticated using voice. A user may request access to a secured resource and the voice of the user may be compared to a reference voice recorded previously. The user may be authenticated upon determination that characteristics of the current voice match the characteristics of the reference voice. The user may then be allowed access to the secured resource.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The increasing use of voice-enabled systems (e.g., interactive voice response, voice-enabled personal assistants, etc.) provides an opportunity for seamless computing system interaction by users using natural language. Voice-enabled systems may allow users to access information in a more natural manner by speaking to a system in a manner similar to how a user would interact with another person. Voice-based authentication may be used to authenticate users requesting access to secured resources. Authenticating the voice of the user may allow access to the secured resources without disrupting the natural conversational flow between the user and the voice-enabled system. The user may have previously created a voice profile for the system (e.g., via a voice training session, through initial use of the system, etc.). The user may request secured information (e.g., financial information, personal information, etc.) from the voice enabled system and the voice of the user may be compared to the voice profile. The user may be granted access to the secured information if the voice of the user matches the voice profile.

During various user-to-system communications, the user and the system may want to authenticate each other (e.g., cross-authentication, bi-directional authentication, etc.). In some known systems, a user may be authenticated by a system, for example, by providing identification and authentication credentials (e.g., username and password). In addition, some known systems have implemented "service authentication" to protect the user from certain types of hacking. Service authentication may allow the user to verify the system being interacted with is authentic (e.g., the service with which they intend to interact with, etc.) to reduce the incidence of phishing and other malicious data collection techniques. Current examples of service authentication may provide a pre-identified image to the user for establishing comfort that the service is authentic, thereby allowing the user to trust the service. However, the user may be interacting with a voice-based service, and display functionality may not be present or may add additional steps or devices to the process, which may make the user less inclined to use the service (e.g., because it is inefficient, too slow, etc.). In addition, transmitting images to additional devices may increase processing and network load as additional transmission channels may be established to enable simultaneous communication with the voice-enabled device and an image display capable device.

The present techniques improve the ability of a computing system delivering voice-based services to efficiently (e.g., lower processing cycles, less network transmissions, etc.) and seamlessly (e.g., using a single device, providing a continuous process flow, etc.) provide a bi-directional, voice-based authentication process that allows both the service to be authenticated with the user, and the user to be authenticated with the service. During configuration, the user may record and upload an audio file of some sound of personal significance to the user. For example, the user may upload a sound of one of their children laughing, or of a song played at their wedding, one of their dogs barking, etc. In addition to the uploaded audio file, text or audio may be captured from the user describing, in their own words, the source of the sound and/or its significance. For example, the user may say "that is the sound of my son, Christopher, crying," or "that is the song we played at our wedding during the father/daughter dance," or "that is my dog, Spot, barking at the front door when a pizza delivery person knocks."

During authentication, the audio file may be output for the user. The user may recognize the audio as their recorded sound allowing the user to verify the authenticity of the service. Upon hearing the sound, the user may speak an explanation of the source (e.g., where the sound was recorded, who/what is making a sound in the audio file, etc.) of the sound back to the system. A voice-based analysis of the user's voice may be performed to match the audio of the user's voice to a voice profile of the user and the current explanation may be compared with a previously-recorded explanation (e.g., an explanation recorded when the audio file was added to the user's profile, etc.).

As such, the user may be authenticated using multiple factors including using voice recognition (e.g., comparing a voice print of the current explanation to a voice print of the previously recorded explanation, etc.) as a factor and private knowledge (e.g., the explanation for the source of the sound, etc.) as a factor. In some examples, profile information such as, for example, demographic information, geographic information, etc. may be compared to data gathered from the user and the user device during the authentication process and may be used as additional authentication factors.

Traditional techniques may rely on repetition of the whole phrase as recorded. The presently described techniques may present an improvement over traditional techniques because the key knowledge elements may be broken out and voice matching may use a combination of the broken out key knowledge elements. Thus, the response of the user to an authentication request may not need to exactly follow the whole phrase previously recorded by the user. By breaking the phrase down to key knowledge elements, different questions may be constructed and the key elements and the voice print associated with each element may be used in making an authentication decision. Therefore, the need for an exact and complete phrase match may be eliminated allowing for robust authentication without a user needing to remember the exact phrase previously recorded.

In some embodiments, the content of both an audio stream including the originally recorded explanation and an audio stream including the current explanation may be parsed to identify content elements for a content-based comparison. For example, the current explanation of "that's Christopher crying" or "my son Christopher" may match the original explanation of "that is the sound of my son, Christopher, crying" because each of the example current explanations correctly identifies several of the key components provided in the original explanation.

The present techniques may also be used in person-to-person transactions. For example, a user may wish to send money to a person (e.g., parent wants to permission child to take out $50 from ATM). The user may initially configure a transaction with an amount, a special passphrase, and optionally a known recipient (i.e., another user, etc.). The person may then approach an ATM and may speak the passphrase. If the person is a known user of the system, then the system may perform both voice recognition on the voice sample and content-based analysis of the voice sample (e.g., using the person's voice profile instead of the user's voice profile).

Figure 1:
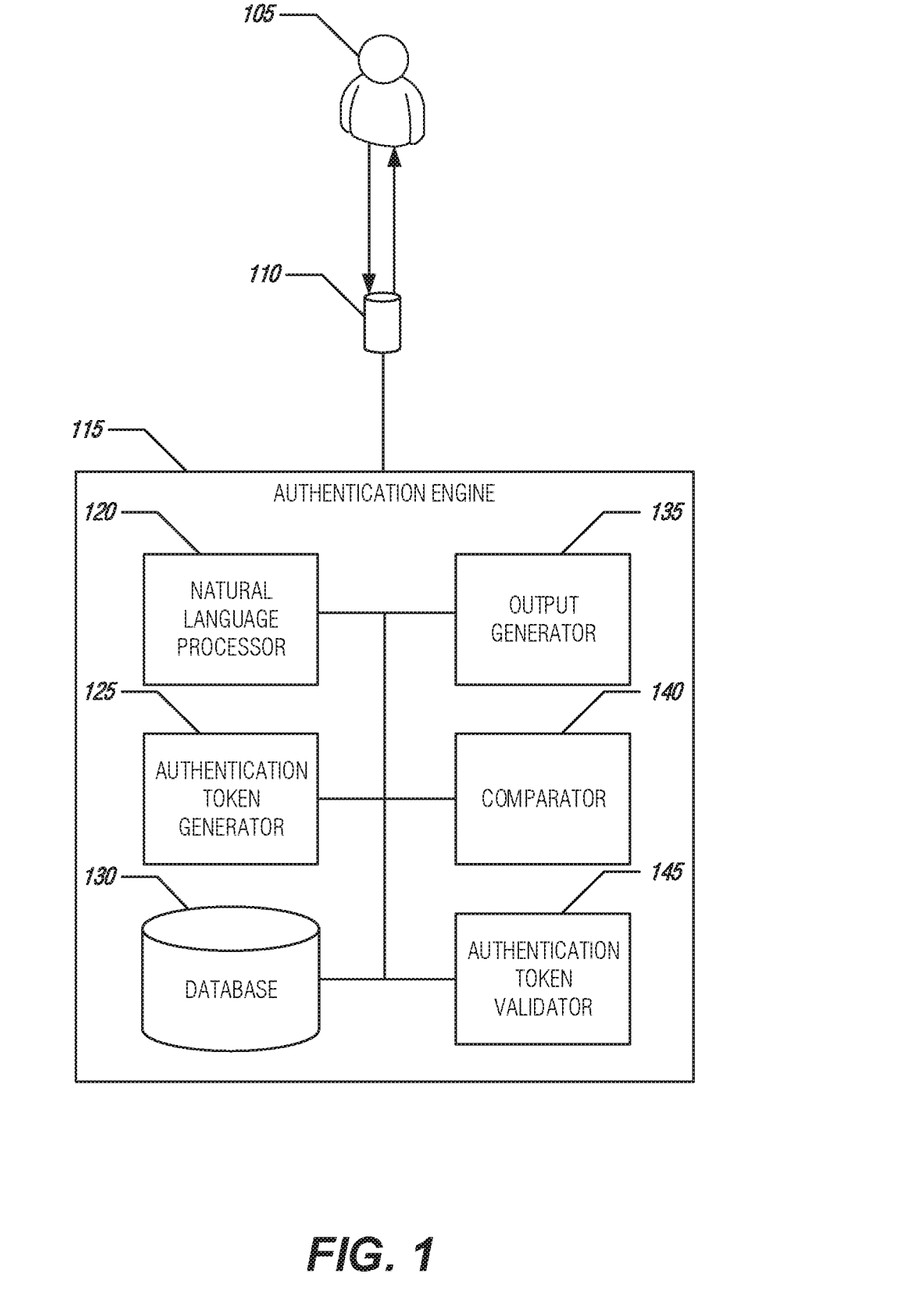
FIG. 1 is a block diagram of an example of an environment and a system for bi-directional voice authentication, according to an embodiment.

FIG. 1 is a block diagram of an example of an environment 100 and a system 115 for bi-directional voice authentication, according to an embodiment. The environment 100 may include a user 105 interacting with a device 110 (e.g., voice-enabled personal assistant device, smartphone, tablet, computing device, etc.). The device 110 may be communicatively coupled to the system 115. The system 115 may be an authentication engine and may include a natural language processor 120, an authentication token generator 125, a database 130, an output generator 135, a comparator 140, and an authentication token validator 145.

The authentication engine 115 may receive a first audio segment and a first description of the first audio segment. For example, the user 105 may upload an audio file including a dog barking. The first audio description of the first audio segment may include a second audio segment of the user 105 speaking or text provided by the user 105 describing the first audio file. For example, the user 105 may say "that is a clip of my dog, Spot, barking" which may be captured as a second audio segment describing the first audio segment.

The natural language processor 120 may use a variety of audio analysis and machine learning techniques to identify and classify words, phrases, etc. included in audio segments. For example, the natural language processor 120 may translate the audio segment into text, may parse the text to identify words, phrases, etc., and may assign meaning or context to words and phrases. In an example, the natural language processor 120 may generate a first text description from the second audio segment. For example, the natural language processor may convert the audio of the user 105 saying "that is a clip of my dog, Spot, barking" from an audio stream to a text string. In an example, audio elements may be recognized in the first audio segment. For example, a wind chime may be chiming in the background, a child may be crying, a dog may be barking, other people may be talking, etc. may be recognized as audio elements in the first audio segment. The audio elements may be stored (e.g., as metadata, etc.) with the first audio segment and may be included in the first description and may be referenced during authentication.

The authentication token generator 125 may create an authentication token using the first audio segment and the first description. For example, the token may consist of the audio file with metadata including the first audio description, a union of the first audio segment and the first description in the database 130, a unique identifier generated from elements of the first audio segment and the first description, etc. The authentication token may be stored in the database 130. The database 130 may include a variety of authentication token records that are indexed by a user identifier or other element that identifies an association between the authentication token and the user 105. The indexing may provide for the selection of a corresponding authentication token for an authentication request made by the user 105.

The user 105 may request secure information from the device 110 and the request may be transmitted to the authentication engine 115. For example, the information may be determined to be secure using a variety of techniques such as, for example, a flag present in metadata for the requested information, by referencing an access control list (ACL), etc. The authentication engine 115 may receive an authentication request from the user 105 (e.g., by attempting to access secured information, etc.). For example, the user 105 may request an account balance for a brokerage account held by a financial institution providing a financial services service to a voice-enabled assistant by speaking "what is the balance of my brokerage account?" which may automatically transmit the authentication request to the authentication engine 115.

In response to receiving the request for authentication, the output generator 135 may transmit the first audio segment to the device 110 to be played for the user 105. For example, the audio file including the barking dog may be played to the user 105 using the device 110. The user 105 may be able to identify that the output audio was a clip that was previously save to a profile at the service. The user 105 may be prompted to provide a second description (e.g., a current description, validation response, etc.) for the first audio segment. For example, the device 110 may output audio stating "please provide a description for the audio you just heard." In response, and knowing that the audio was a clip provided by the user 105, the user 105 may speak a description of the audio that has just been output. Additionally or alternatively, the user 105 may enter a text description (e.g., via a mobile application text message, etc.) of the audio which may be helpful when the user 105 does not want to reveal the description (e.g., in a public area, etc.).

The authentication engine 115 may receive the second description of the first audio segment from the device 110 of the user 105 in response to the transmission of the first audio segment. For example, the user may respond to the prompt for a description by saying "That is my dog, Spot, barking." In an example, the second description may include a third audio segment and a second text description may be generated from the third audio segment by the natural language processor 120. For example, text may be extracted from the audio of the response of the user 105 and the text may be compared to text extracted from the first description and/or audio elements identified in the first audio segment.

In an example, it may be identified that the user is in a public location based on geolocation data (e.g., longitude-latitude coordinates included in a geographic footprint of a retail store, etc.) obtained from the device and the second audio description may be requested via a text input mode of the device. For example, it may be determined from geolocation data collected from a mobile phone of the user 105 that the user 105 is at a grocery store that is normally buys during the time and day in which the authentication request was received. Rather than requesting that the user speak a description of the first audio segment, a text may be transmitted to the mobile phone of the user 105 requesting that the user 105 reply with the description for the first audio file via a reply text message. Thus, privacy may be retained while maintaining the natural flow of the interaction through a different modality of the mobile phone.

The comparator 140 may compare the second description to the first description. For example, the current description of the first audio segment may be compared to the previously provide description of the first audio file included in the profile of the user 105. In an example, the comparison of the second description to the first description may include comparing text included in the second description with the first text description. For example, the user 105 may enter text of the description into a mobile application connected to the authentication engine 115 and the text entered may be compared to the first text description of the audio file uploaded by the user 105 stored (e.g., in the database 130, etc.) by the authentication engine 115.

In another example, the natural language processor 120 may receive the second description as audio and may convert the audio to text which may then be compared to the first text description. In an example, the comparison of the second description to the first description may include matching audio elements included in the first description with keywords identified (e.g., by the natural language processor 120, etc.) in the second description. In an example, a synonym library corresponding to each of the audio elements may be accessed and the keywords identified in the second description may be compared to members of the synonym library.

In another example, the second description may be compared to elements identified in the first audio segment. For example, a barking dog and a child crying may be identified in the first audio segment and a description provided by the user 105 saying "that is my dog barking while my son cries" may be compared to the identified elements to determine that the description matches two elements present in the first audio file. In an example, profile information of the user 105 may be accessed to aid in determining that the second description matches the first audio segment. For example, the profile of the user 105 may include data indicating that the user 105 has a dog named Spot and a son named Christopher and the profile information may be used to supplement the first description and/or the second description.

The authentication token validator 145 may select the authentication token based on the comparison result provided by the comparator 140. Selection of the authentication token may provide an indication that the authentication token corresponds to the user (e.g., working as an additional authentication factor, etc.). For example, if the comparison indicates that the second description matches (or is similar enough to) the second description the authentication token validator 145 may select the authentication token. The authentication token validator 145 may include a variety of rules for determining when the results of the comparator 140 are sufficient to select the authentication token. For example, the comparator 140 may use a variety of described techniques to determine confidence scores indicating the likelihood that the second description matches the first description and/or that the second description matches the first audio segment and the authentication token validator 145 may use a threshold to determine if a confidence score (or an aggregated confidence score) is at or exceeding a threshold confidence score value and thus the token may be selected. The token may then be transmitted to the device 110.

Requests of the user 105 for secure information may then be authenticated by the authentication engine 115 using the authentication token for a duration of interaction between the user 105 and the device 110. In an example, the second description may be received as a voice segment of the user 105 and authenticating the user 105 may include comparing the voice segment to a voice profile (e.g., including a voiceprint, audio characteristics, etc.) of the user 105. In an example, geolocation data may be collected from the device and authenticating the user 105 may be based in part on comparing the geolocation data to a set of profile geographic data included in a profile of the user 105. For example, the a profile may be maintained for the user 105 (e.g., in database 103, etc.) and the profile may include geographic information such as, for example, home address, work address, frequently visited locations, device locations, etc. The geographic information in the profile may be reference against the current geolocation data of the device to determine whether the device is in an expected location (e.g., in or near the geographic locations included in the profile, etc.).

The period of time during which the device holds and uses the authentication token for authenticating requests of the user 105 may vary. For example, the authentication token may be assigned to the device 110 while the device is registered to a profile of the user 105, for the duration of a current session between the user 105 and the device 110 (e.g., during a continuous conversation stream between the user 105 and the device 110, etc.), for a set period of time (e.g., for a time window, etc.), etc. Upon expiration of the period of time the user 105 may re-authenticate to initialize retransmission of the authentication token to the device 110.

In an example, the user 105 may create a person-to-person electronic transaction and may generate the first audio segment and the first description as part of the electronic transaction. The user 105 may provide a recipient (e.g., payee, etc.) of the electronic transaction with a transaction identifier (e.g., transaction number, description of the transaction, etc.) and the first description. The recipient may provide the transaction identifier and a second description to a device (e.g., mobile phone, automated teller machine (ATM), etc.) and the second description may be compared to the first description to determine a match (or similarity) between the second description and the first description and process the transaction based on the comparison. In an example, the recipient may be another user and the first audio segment and the first description may be included in a profile of the recipient when the transaction is created by the user 105. The other user may then be authenticated using the techniques discussed above. In an example, a voiceprint included in a profile of the recipient may be compared to a voiceprint generated during authentication (e.g., from the second description, etc.) of the recipient and the transaction.

Thus, multiple factors may be used to authenticate that the recipient is authorized to complete the transaction.

Figure 6:
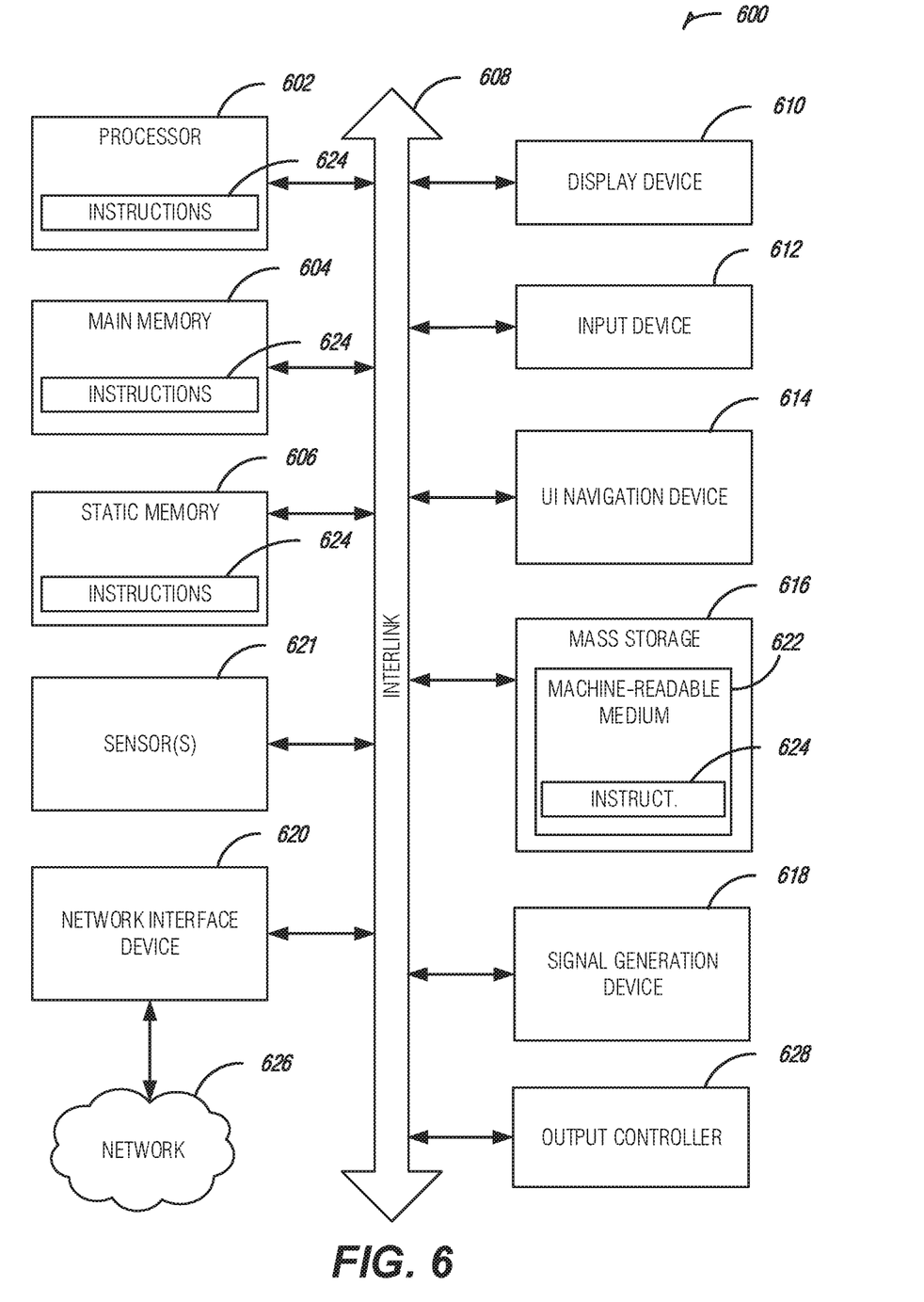
FIG. 6 is a block diagram illustrating an example of a machine upon which one or more embodiments may be implemented.

The authentication engine 115, the natural language processor 120, the authentication token generator 125, the output generator 135, the comparator 140, and the authentication token validator 145 may comprise one or more processors (e.g., hardware processor 602 described in FIG. 6, etc.) that execute software instructions, such as those used to define a software or computer program, stored in a computer-readable storage medium such as a memory device (e.g., a main memory 604 and a static memory 606 as described in FIG. 6, a Flash memory, random access memory (RAM), or any other type of volatile or non-volatile memory that stores instructions), or a storage device (e.g., a disk drive, or an optical drive). The components may be implemented in one or more computing devices (e.g., a single computer, multiple computers, a cloud computing platform, a virtual computing platform, etc.). Alternatively, the authentication engine 115, the natural language processor 120, the authentication token generator 125, the output generator 135, the comparator 140, and the authentication token validator 145 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Figure 2:
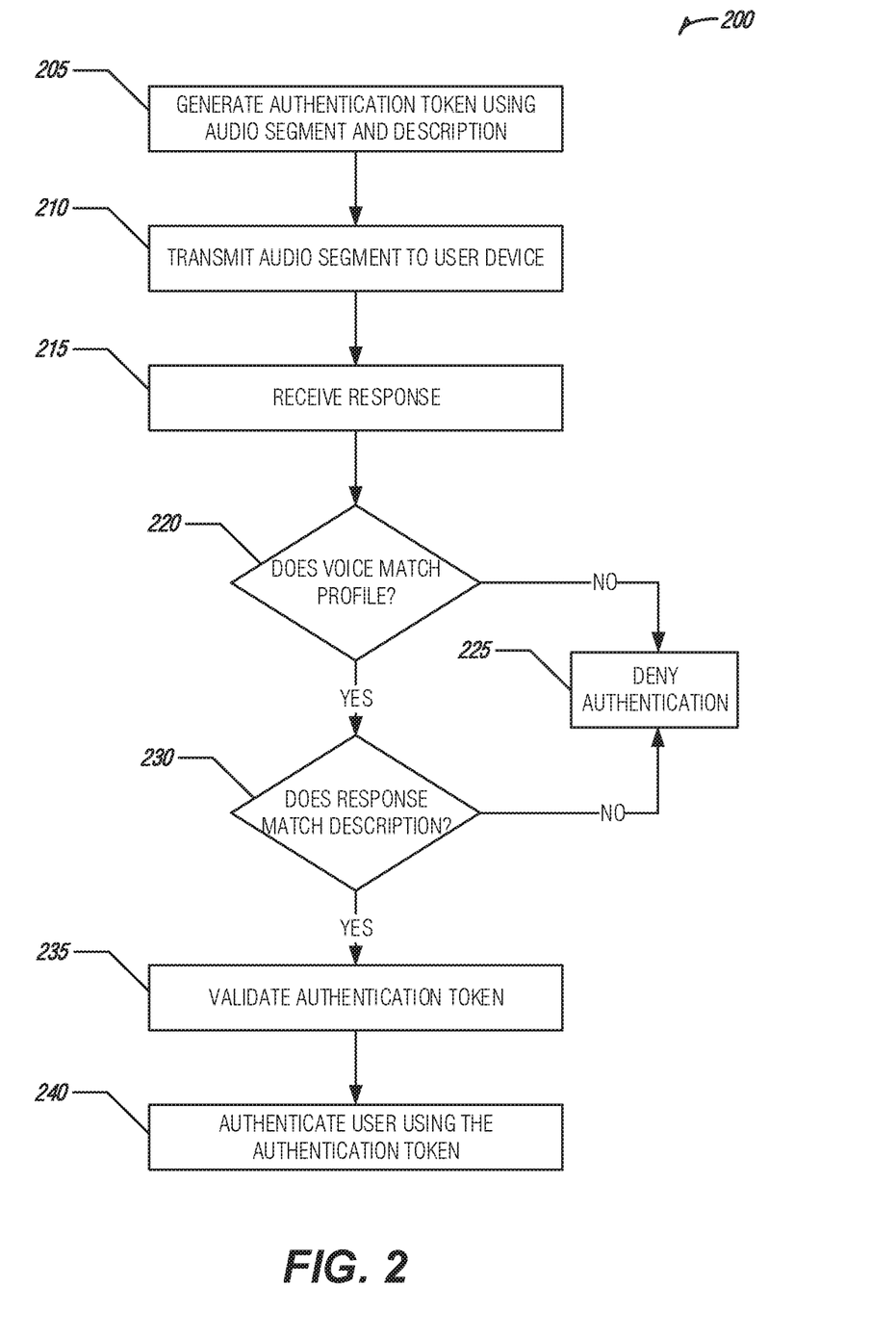
FIG. 2 illustrates a flow diagram of an example of a process for bi-directional voice authentication, according to an embodiment.

FIG. 2 illustrates a flow diagram of an example of a process 200 for bi-directional voice authentication, according to an embodiment. The process 200 may provide features as described in FIG. 1. A user may request secured information from a service delivered via a voice-enabled device. An authentication token may be generated using an audio segment and description (e.g., at operation 205). The audio segment may be transmitted to a user device (e.g., at operation 210). A response may be received from the user (e.g., at operation 215). The response may include another audio segment, text, etc. describing the audio segment transmitted to the user device.

A voice included in the response may be compared to information included in a profile of the user (e.g., at operation 220). The profile of the user may include a voiceprint of the user's voice, a previously recorded description of the audio segment, text of a description of the audio segment, elements contained in the audio segment (e.g., automatically identified sounds, etc.), demographic information, geographic information, etc. For example, a voiceprint may be generated for the response received from the user (e.g., an audio segment including a spoken description of the audio segment, etc.) which may be compared to the voiceprint in the profile of the user.

If the voice of the user does not match the profile of the user, the authentication of the user may be denied (e.g., at operation 225). If the voice of the user matches the profile of the user (e.g., based on a match between the current voiceprint and the previous voiceprint, etc.), the response may be compared to the profile information to determine if it matches the description (e.g., at operation 230). Elements of the received response may be compared to elements included in the profile of the user including the description. For example, another audio segment may be obtained including a spoken description of the audio segment transmitted to the user. The audio segment including the description may be processed using natural language processing to translate the audio into text. The text may be compared to text of a description of the audio segment included in the profile of the user.

If the response does not match the description, authentication of the user may be denied (e.g., at operation 225). If the response is determined to match the description, the authentication token may be validated (e.g., at operation 235). For example, the authentication token may be validated as corresponding to the user providing the response. The user may be authenticated using the validated authentication token (e.g., at operation 240). For example, the secured information requested by the user may be transmitted to a device of the user.

Figure 3:
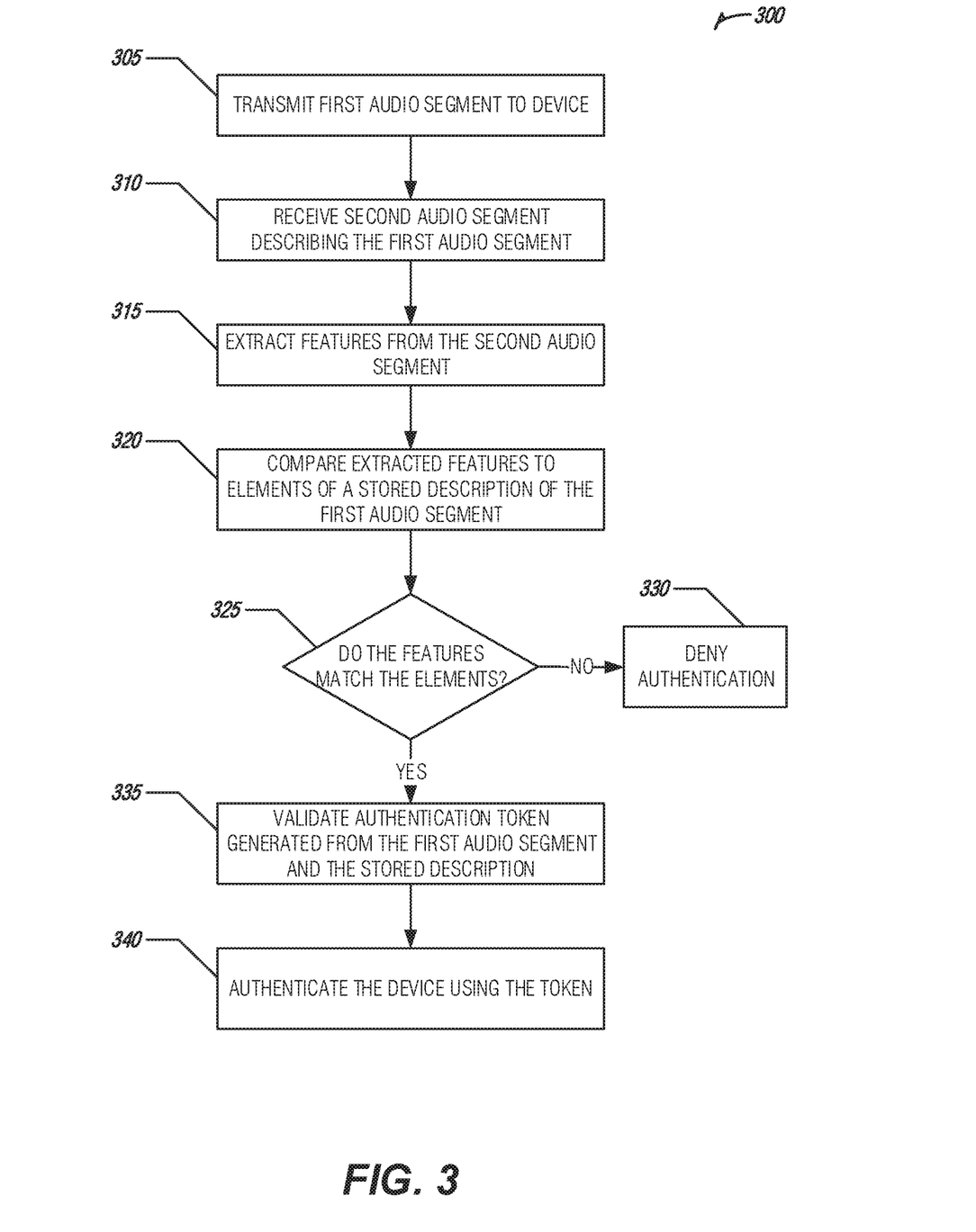
FIG. 3 illustrates a flow diagram of an example of a process for bi-directional voice authentication using extracted features, according to an embodiment.

FIG. 3 illustrates a flow diagram of an example of a process 300 for bi-directional voice authentication using extracted features, according to an embodiment. The process 300 may provide features as described in FIG. 1. A user may request secured information from a voice-enabled service of a device. A first audio segment may be transmitted to the device (e.g., at operation 305). A second audio segment describing the first audio segment may be received from the device (e.g., at operation 310).

Features may be extracted from the second audio segment (e.g., at operation 315). The features may include text extracted from the second audio segment by a natural language processor, voice characteristics of a voice included in the second audio segment (e.g., tone, amplitude, timbre, etc.), sounds identified in the second audio segment, etc. The extracted features may be compared to elements of a stored description of the first audio segment (e.g., at operation 320). The stored description may be included in a profile of the user and may include text, voice characteristics of a voice used to create the stored description, sounds identified in the stored description, etc.

If the features extracted from the second audio segment do no match the elements of the stored description of the first audio segment, authentication of the user may be denied (e.g., at operation 330). If the features extracted from the second audio segment do no match the elements of the stored description of the first audio segment, an authentication token generated from the first audio segment and the stored description may be validated (e.g., at operation 335). For example, it may be determined that a threshold number of elements extracted from the second audio segment match elements of the stored description. The authentication token may then be authenticated as corresponding to the user providing the second audio segment.

The device of the user may be authenticated using the token (e.g., at operation 340). For example, the device may have captured and transmitted the second audio segment and may be authorized for output of the secured data using the authentication token based on the features extracted from the second audio segment matching the elements of the stored audio description.

Figure 4:
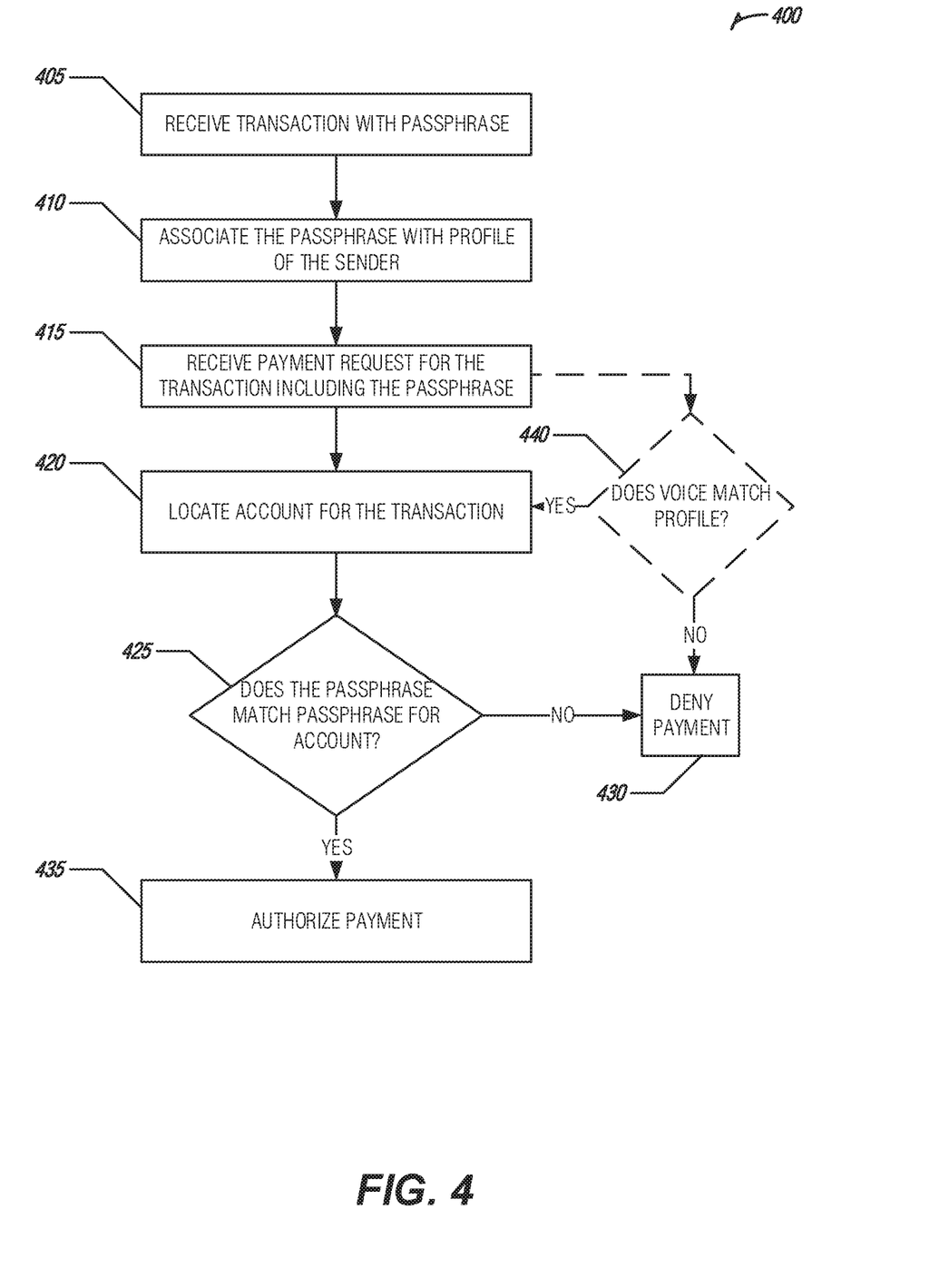
FIG. 4 illustrates a flow diagram of an example of a process for processing a transaction using bi-directional voice authentication, according to an embodiment.

FIG. 4 illustrates a flow diagram of an example of a process 400 for processing a transaction using bi-directional voice authentication, according to an embodiment. The process 400 may provide features as described in FIG. 1. A user may generate a transaction (e.g., a person-to-person transaction, etc.) using a passphrase. The transaction information including the passphrase may be received (e.g., at operation 405). The passphrase may be associated with a profile of a sender of the transaction information and passphrase (e.g., at operation 410). For example, a user may create a payment request requesting a payment be made to another user and may include the passphrase "payment for concert tickets" and the passphrase may be save with the other transaction information.

A payment request may be received for the transaction including the passphrase (e.g., at operation 415). For example, the other user (e.g., payee, etc.) may provide a transaction identifier and the passphrase "payment for concert tickets" to an ATM requesting an amount indicated in the transaction information.

An account corresponding with the transaction may be located (e.g., at operation 420). For example, the account of the user may be located based on the transaction identifier provided by the other user. It may be determined if the passphrase matches the passphrase for the transaction included in the located account (e.g., at operation 425). If the passphrase provided by the other user does not match the passphrase included in the located account the payment may be denied (e.g., at operation 430). If it is determined that the passphrase provided by the other user matches the passphrase in the located account the payment may be authorized (e.g., at operation 435). For example, the ATM may dispense the amount of money indicated in the transaction information.

In an example, the other user may be identified as having a user profile with the service. For example, the other user may provide a user id and password, elements of the other user's voice may be used to select a set of possible profiles, the transaction information may include an identity of the other user, etc. The voice of the other user (e.g., as provided with the passphrase, etc.) may be compared to a voice profile of the other user to determine if it matches (e.g., based on voiceprint match, audio characteristics, etc.) the profile of the other user (e.g., at operation 440). If the voice of the other user does not match the profile of the other user, the payment may be denied (e.g., at operation 430). If the voice of the other user is determined to match the profile of the other user, processing may continue at operation 420 as described above.

Figure 5:
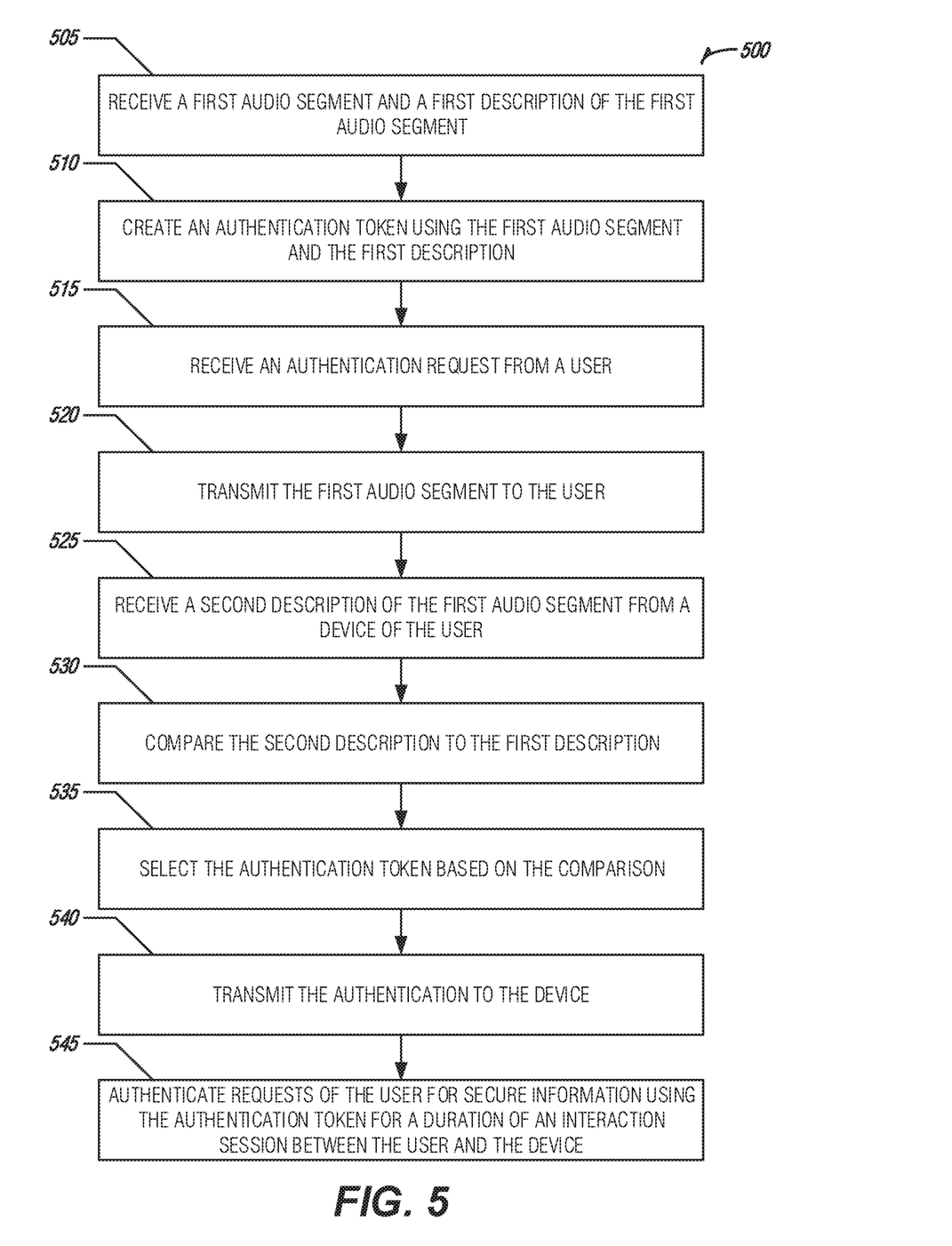
FIG. 5 illustrates an example of a method for bi-directional voice authentication, according to an embodiment.

FIG. 5 illustrates an example of a method 500 for bi-directional voice authentication, according to an embodiment. The method 400 may provide features as described in FIGS. 1-4.

A first audio segment and a first description of the first audio segment may be received (e.g., at operation 505). In an example, the first description may include a second audio segment that describes the first audio segment and a first text description may be generated from the second audio segment by a natural language processor. In an example, audio elements may be recognized in the first audio segment and the audio elements may be included in the first description.

An authentication token may be created using the first audio segment and the first description (e.g., at operation 510). For example, the audio token may be a combination of the first audio segment and the first description such as, for example, a unique identifier generated based on all or a portion of the data included in each of the first audio segment and the first description, a union of the records for the first audio segment and the first description included in a database including the first audio segment and the first description, a unique identifier based on the union (e.g., table and field indenters, etc.), etc.

An authentication request may be received from a user (e.g., at operation 515). For example, the user may request access to financial records from a financial services service enabled on a voice-enabled personal assistant, etc. The authentication request may identify a user and the content the user would like to access. The service may determine that some or all of the requested information is secured which may trigger generation of the authentication request.

The first audio segment may be transmitted to the user (e.g., at operation 520). For example, an audio clip previously recorded by the user may have been uploaded to a user profile stored with the service from which secured information has been requested. The user may hear the first audio segment and verify the authenticity of the service based on the first audio segment being expected to be associated with the service (e.g., previously uploaded by the user, etc.).

A second description of the first audio segment may be received from a device of the user (e.g., at operation 525). In an example, the second description may include a third audio segment. In an example, a second text description may be generated from the third audio segment by a natural language processor. In an example, it may be identified that the user is in a public location based on geolocation data obtained from the device and the second description may be requested via a text input mode of the device.

The second description may be compared to the first description (e.g., at operation 530). In an example, the comparison may include a comparison of text included in the second description and the first text description. In another example, the comparison may include a comparison of the second text description and the first text description. In another example, the comparison may include identifying a match between the audio elements include in the first description and keywords identified in the second description. In an example, a synonym library may be access corresponding to each of the audio elements and the keywords may be compared to members of the synonym library.

The authentication token may be selected based on the comparison (e.g., at operation 535). For example, the authentication token may be selected as corresponding to the user providing the second description based on closeness of a match determined in the comparison of the second description to the first description. Additionally or alternatively, the authentication token may be selected as corresponding to the device based on the comparison. For example, it may be determined that a user has provided a sufficient description of the first audio segment using the device and, thus, the device is determined to corresponding with the user (e.g., as a proxy, etc.).

The authentication token may be transmitted to the device (e.g., at operation 540). For example, the device may be provided the authentication token for presenting with authentication requests on behalf of the user. Requests of the user for secure information may be authenticated using the authentication token for a duration of an interaction session between the user and the device (e.g., at operation 545). For example, the user may request a financial information from a financial service application and the device may transmit an authentication request for the financial information along with the authentication token. The financial services application may authenticate the user using the authentication token and may transmit the financial information to the device for presentation to the user. In an example, the second description may be received as a voice segment of the user and the authentication of the requests may include a comparison of the voice segment to a voice profile of the user. In another example, geolocation data may be collected from the device and the requests may be authenticated in part based on a comparison of the geolocation data to a set of geographic data included in a profile of the user.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for bi-direction voice authentication, the system comprising:
   at least one processor; and
   memory including instructions that, when executed by the at least one processor, cause the at least one processor to perform operations to:
      receive a first audio segment provided by a user and a first description of the first audio segment, wherein the first description includes audio of the user that describes content of the first audio segment, and wherein the first description includes a unique sequence of words based on user-specific content of the first audio segment;
      create an authentication token using the first audio segment and the first description, wherein the authentication token is used to validate a request for secure information, and wherein the authentication token includes a voiceprint of the first description as a first authentication factor and the unique sequence of words based on the user-specific content of the first audio segment as a second authentication factor;
      store the authentication token, the first audio segment, and the first description within a user profile of the user;
      receive an authentication request from the user;
      in response to receipt of the authentication request, transmit the first audio segment to the user;
      receive a second description of the first audio segment from a device of the user in response to the transmission of the first audio segment, wherein the second description includes audio that describes the content of first audio segment;
      compare the second description to the first description, wherein the comparison includes determining that a voiceprint of the second description matches the first factor of authentication and that the second description matches the second authentication factor;
      select the authentication token based on the comparison;
      transmit the authentication token to the device; and
      authenticate requests of the user for the secure information using the authentication token for a duration of an interaction session between the user and the device.

2. The system of claim 1, wherein the first description includes a second audio segment that describes the first audio segment and the instructions further comprise instructions to:
   generate a first text description from the second audio segment by a natural language processor, wherein the instructions to compare the second description to the first description include instructions to compare text included in the second description to the first text description.

3. The system of claim 1, wherein the second description includes a third audio segment and the instructions further comprise instructions to:
   generate a second text description from the third audio segment by a natural language processor, wherein the instructions to compare the second description to the first description include instructions to compare the second text description to the first text description.

4. The system of claim 1, further comprising instructions to:
   recognize audio elements in the first audio segment; and
   include the audio elements in the first description, wherein the instructions to compare the second description to the first description include instructions to match the audio elements included in the first description with keywords identified in the second description.

5. The system of claim 4, wherein the instructions to match the audio elements included in the first description with keywords identified in the second description further comprises instructions to:
   access a synonym library that includes synonyms for each of the audio elements; and
   compare the keywords identified in the second description to synonyms of the synonym library, wherein the instructions to match the audio elements included in the first description to with the keywords identified in the second description include use of the comparison of the keywords to the synonyms.

6. The system of claim 1, further comprising instructions to:
   receive the second description as a voice segment of the user; and
   compare the voice segment to a voice profile of the user, wherein the instructions to authenticate the requests include instructions to use results of the comparison of the voice segment to the voice profile of the user.

7. The system of claim 1, further comprising instructions to:
   collect geolocation data from the device; and
   compare the geolocation data to a set of profile geographic data included in a profile of the user, wherein the instructions to authenticate the requests include instructions to authenticate the user based in part on results of the comparison of the geolocation data to the set of profile geographic data.

8. The system of claim 1, further comprising instructions to:
   identify the user is in a public location based on geolocation data obtained from the device; and
   in response to the identification, request the second description via a text input mode of the device.

9. The system of claim 1, further comprising instructions to:
   receive a request for a transaction, wherein the request includes transaction information for the transaction, and wherein the transaction information includes a second audio segment that includes an utterance of a passphrase by the user;
   store the transaction information in a profile of the user;
   receive a transaction processing request from a recipient of the transaction request, wherein the transaction request includes a third audio segment that includes an utterance of the passphrase by the recipient;
   in response to receipt of the transaction processing request, retrieve the transaction information from the profile of the user; and
   process the transaction upon determination that the utterance of the passphrase by the user matches the utterance of the passphrase by the recipient.

10. At least one non-transitory machine-readable medium including instructions for bi-direction voice authentication that, when executed by at least one processor, cause the at least one processor to perform operations to:
    receive a first audio segment provided by a user and a first description of the first audio segment, wherein the first description includes audio of the user that describes content of the first audio segment and wherein the first description includes a unique sequence of words based on user-specific content of the first audio segment;
    create an authentication token using the first audio segment and the first description, wherein the authentication token is used to validate a request for secure information, and wherein the authentication token includes a voiceprint of the first description as a first authentication factor and the unique sequence of words based on the user-specific content of the first audio segment as a second authentication factor;
    store the authentication token, the first audio segment, and the first description within a user profile of the user;
    receive an authentication request from the user;
    in response to receipt of the authentication request, transmit the first audio segment to the user;
    receive a second description of the first audio segment from a device of the user in response to the transmission of the first audio segment, wherein the second description includes audio that describes the content of first audio segment;
    compare the second description to the first description, wherein the comparison includes determining that a voiceprint of the second description matches the first factor of authentication and that the second description matches the second authentication factor;
    select the authentication token based on the comparison;
    transmit the authentication token to the device; and
    authenticate requests of the user for the secure information using the authentication token for a duration of an interaction session between the user and the device.

11. The at least one non-transitory machine-readable medium of claim 10, wherein the first description includes a second audio segment that describes the first audio segment and the instructions further comprise instructions to:
    generate a first text description from the second audio segment by a natural language processor, wherein the instructions to compare the second description to the first description include instructions to compare text included in the second description to the first text description.

12. The at least one non-transitory machine-readable medium of claim 10, wherein the second description includes a third audio segment and the instructions further comprise instructions to:
    generate a second text description from the third audio segment by a natural language processor, wherein the instructions to compare the second description to the first description include instructions to compare the second text description to the first text description.

13. The at least one non-transitory machine-readable medium of claim 10, further comprising instructions to:
    recognize audio elements in the first audio segment; and
    include the audio elements in the first description, wherein the instructions to compare the second description to the first description include instructions to match the audio elements included in the first description with keywords identified in the second description.

14. The at least one non-transitory machine-readable medium of claim 13, wherein the instructions to match the audio elements included in the first description with keywords identified in the second description further comprises instructions to:
    access a synonym library that includes synonyms for each of the audio elements; and
    compare the keywords identified in the second description to synonyms of the synonym library, wherein the instructions to match the audio elements included in the first description to with the keywords identified in the second description include use of the comparison of the keywords to the synonyms.

15. The at least one non-transitory machine-readable medium of claim 10, further comprising instructions to:
receive the second description as a voice segment of the user; and
compare the voice segment to a voice profile of the user, wherein the instructions to authenticate the requests include instructions to use results of the comparison of the voice segment to the voice profile of the user.

16. The at least one non-transitory machine-readable medium of claim 10, further comprising instructions to:
collect geolocation data from the device; and
compare the geolocation data to a set of profile geographic data included in a profile of the user, wherein the instructions to authenticate the requests include instructions to authenticate the user based in part on results of the comparison of the geolocation data to the set of profile geographic data.

17. The at least one non-transitory machine-readable medium of claim 10, further comprising instructions to:
identify the user is in a public location based on geolocation data obtained from the device; and
in response to the identification, request the second description via a text input mode of the device.

18. A method for bi-direction voice authentication, the method comprising:
receiving a first audio segment provided by a user and a first description of the first audio segment, wherein the first description includes audio of the user that describes content of the first audio segment, and wherein the first description includes a unique sequence of words based on user-specific content of the first audio segment;
creating an authentication token using the first audio segment and the first description, wherein the authentication token is used to validate a request for secure information, and wherein the authentication token includes a voiceprint of the first description as a first authentication factor and the unique sequence of words based on the user-specific content of the first audio segment as a second authentication factor;
storing the authentication token, the first audio segment, and the first description within a user profile of the user;
receiving an authentication request from the user;
in response to receiving the authentication request, transmitting the first audio segment to the user;
receiving a second description of the first audio segment from a device of the user in response to the transmission of the first audio segment, wherein the second description includes audio that describes the content of first audio segment;
comparing the second description to the first description, wherein the comparison includes determining that a voiceprint of the second description matches the first factor of authentication and that the second description matches the second authentication factor;
selecting the authentication token based on the comparison;
transmitting the authentication token to the device; and
authenticating requests of the user for the secure information using the authentication token for a duration of an interaction session between the user and the device.

19. The method of claim 18, wherein the first description includes a second audio segment describing the first audio segment and the method further comprises:
generating a first text description from the second audio segment using natural language processing, wherein comparing the second description to the first description includes comparing text included in the second description to the first text description.

20. The method of claim 18, wherein the second description includes a third audio segment and the method further comprises:
generating a second text description from the third audio segment using natural language processing, wherein comparing the second description to the first description includes comparing the second text description to the first text description.

21. The method of claim 18, further comprising:
recognizing audio elements in the first audio segment; and
including the audio elements in the first description, wherein comparing the second description to the first description includes matching the audio elements included in the first description with keywords identified in the second description.

22. The method of claim 21, wherein matching the audio elements included in the first description with keywords identified in the second description further comprises:
accessing a synonym library that includes synonyms for each of the audio elements; and
comparing the keywords identified in the second description to synonyms of the synonym library, wherein matching the audio elements included in the first description to with the keywords identified in the second description includes using the comparison of the keywords to the synonyms.

23. The method of claim 18, further comprising:
receiving the second description as a voice segment of the user; and
comparing the voice segment to a voice profile of the user, wherein authenticating the requests includes using results of the comparison of the voice segment to the voice profile of the user.

24. The method of claim 18, further comprising:
collecting geolocation data from the device; and
comparing the geolocation data to a set of profile geographic data included in a profile of the user, wherein authenticating the requests is based in part on results of the comparison of the geolocation data to the set of profile geographic data.

25. The method of claim 18, further comprising:
identifying the user is in a public location based on geolocation data obtained from the device; and
in response to the identification, requesting the second description via a text input mode of the device.

* * * * *

UNITED STATES PATENT AND TRADEMARK OFFICE
CERTIFICATE OF CORRECTION

PATENT NO. : 10,979,423 B1
APPLICATION NO. : 15/799250
DATED : April 13, 2021
INVENTOR(S) : Garner, IV et al.

Page 1 of 1

It is certified that error appears in the above-identified patent and that said Letters Patent is hereby corrected as shown below:

In the Claims

In Column 15, Line 65, in Claim 10, after "segment", insert --,--

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*